(12) United States Patent
Sakka et al.

(10) Patent No.: US 10,690,215 B2
(45) Date of Patent: Jun. 23, 2020

(54) DAMPER WITH ELECTRO-MAGNETIC ACTUATOR

(71) Applicant: Tenneco Automotive Operating Company Inc., Lake Forest, IL (US)

(72) Inventors: Monzer Al Sakka, Sint-Truiden (BE); Miguel Dhaens, Lommel (BE); Christophe Lauwerys, Heverlee (BE); Thibault Le Polain, Sterrebeek (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 191 days.

(21) Appl. No.: 15/903,571

(22) Filed: Feb. 23, 2018

(65) Prior Publication Data

US 2019/0264771 A1    Aug. 29, 2019

(51) Int. Cl.
    *F16F 9/512* (2006.01)
    *B60G 17/015* (2006.01)
    *F16F 9/32* (2006.01)

(52) U.S. Cl.
    CPC ........ *F16F 9/5126* (2013.01); *B60G 17/0152* (2013.01); *F16F 9/3292* (2013.01);
    (Continued)

(58) Field of Classification Search
    CPC .... F16F 9/5126; F16F 9/3292; F16F 2230/08; F16F 2230/18; F16F 2222/06;
    (Continued)

(56) References Cited

U.S. PATENT DOCUMENTS

| 4,726,453 A | * | 2/1988 | Obstfelder | ......... B60G 17/0152 |
| | | | | 137/625.35 |
| 5,060,959 A | * | 10/1991 | Davis | ..................... B60G 13/14 |
| | | | | 267/64.24 |

(Continued)

FOREIGN PATENT DOCUMENTS

| CN | 106224425 A | 12/2016 |
| DE | 10203802 A1 | 10/2002 |

(Continued)

OTHER PUBLICATIONS

International Search Report in related PCT Application No. PCT/US2019/018291 dated May 28 2019.

(Continued)

*Primary Examiner* — Paul N Dickson
*Assistant Examiner* — Timothy Wilhelm
(74) *Attorney, Agent, or Firm* — Donald G. Walker (57) ABSTRACT

A damper system for a vehicle is provided that includes an outer tube, a piston rod, and a piston assembly that is mounted to the piston rod and separates the outer tube into first and second working chambers. A valve assembly, mounted to the piston assembly, controls fluid flow between the first and second working chambers. A magnetic rotor is fixed to and extends annularly about the outer tube. A stator assembly is coupled to the piston rod by a spherical bearing assembly. The stator assembly includes a plurality of coils that apply an active damping force to the piston rod when energized. The coils can also generate electricity from axial movements of the piston rod relative to the outer tube. One or more glide bearings are disposed radially between the coils and the magnetic rotor in a sliding fit to stabilize the stator assembly.

20 Claims, 5 Drawing Sheets

(52) U.S. Cl.
CPC ...... *B60G 2600/24* (2013.01); *B60G 2600/26* (2013.01); *F16F 2222/06* (2013.01); *F16F 2230/08* (2013.01); *F16F 2230/18* (2013.01)

(58) Field of Classification Search
CPC ............ B60G 17/0152; B60G 2600/24; B60G 2600/26; B60G 17/08; B60G 13/14; B60G 2202/42; B60G 2401/17; B60G 2400/71; B60G 2400/7162; B60G 2500/10; B60G 2400/252
See application file for complete search history.

(56) References Cited

U.S. PATENT DOCUMENTS

| | | | | |
|---|---|---|---|---|
| 5,070,284 | A | * | 12/1991 | Patil ................. B60G 13/02 188/266.8 |
| 5,251,729 | A | * | 10/1993 | Nehl ................. B60G 17/019 188/266.1 |
| 5,293,969 | A | | 3/1994 | Yamaoka et al. |
| 5,350,983 | A | * | 9/1994 | Miller ................. B60G 17/002 318/400.08 |
| 5,467,971 | A | | 11/1995 | Hurtubise et al. |
| 5,638,927 | A | * | 6/1997 | Cheatham ............. F16F 9/3235 188/315 |
| 6,920,951 | B2 | * | 7/2005 | Song ................. B60K 25/10 180/165 |
| 6,952,060 | B2 | | 10/2005 | Goldner et al. |
| 7,261,171 | B2 | * | 8/2007 | de la Torre ........... B60G 13/14 180/165 |
| 7,469,910 | B2 | * | 12/2008 | Munster .............. B60G 15/065 280/124.147 |
| 7,644,935 | B2 | * | 1/2010 | Munster .............. B60G 15/065 280/124.147 |
| 7,887,071 | B2 | * | 2/2011 | Grieshaber ........ B60G 17/0162 280/124.106 |
| 7,926,822 | B2 | * | 4/2011 | Ohletz ................ B60G 11/16 280/124.179 |
| 7,956,797 | B2 | | 6/2011 | Talty et al. |
| 7,963,529 | B2 | * | 6/2011 | Oteman .............. B60G 13/001 188/266 |
| 7,997,395 | B2 | | 8/2011 | Ohkita et al. |
| 8,205,864 | B2 | * | 6/2012 | Michel ................ B60G 15/065 188/299.1 |
| 8,253,281 | B2 | | 8/2012 | Namuduri et al. |
| 8,560,172 | B2 | * | 10/2013 | Lee ................... B60G 17/0157 701/37 |
| 8,573,573 | B2 | * | 11/2013 | Michel ................ B60G 15/068 267/218 |
| 8,641,052 | B2 | * | 2/2014 | Kondo ................ B60G 11/58 280/5.514 |
| 8,668,060 | B2 | * | 3/2014 | Kondo ................ B60G 13/02 188/267 |
| 8,843,274 | B2 | * | 9/2014 | Ogawa ................ B60G 13/02 701/37 |
| 9,050,874 | B2 | * | 6/2015 | Kohlhauser .......... B60G 15/063 |
| 9,835,222 | B2 | * | 12/2017 | Berg .................. F04B 17/04 |
| 2003/0034697 | A1 | * | 2/2003 | Goldner ............. B60G 17/0157 310/17 |
| 2008/0290624 | A1 | | 11/2008 | Yamanaka et al. |
| 2009/0026989 | A1 | * | 1/2009 | Kubota .............. B60G 17/0157 318/400.02 |
| 2009/0120745 | A1 | * | 5/2009 | Kondo ................ B60G 11/27 188/267 |
| 2009/0121398 | A1 | * | 5/2009 | Inoue ................. B60G 13/16 267/140.14 |
| 2010/0032544 | A1 | | 2/2010 | Tsakiris |
| 2010/0219798 | A1 | * | 9/2010 | Namuduri ........... H02K 7/1876 322/3 |
| 2012/0193919 | A1 | | 8/2012 | Kuriki |
| 2014/0238793 | A1 | * | 8/2014 | Nanbara .................. F16F 6/00 188/267 |
| 2015/0061244 | A1 | * | 3/2015 | Klein .................. B60G 15/062 280/5.515 |
| 2015/0231942 | A1 | * | 8/2015 | Trangbaek .............. F16F 15/03 267/195 |
| 2017/0219045 | A1 | | 8/2017 | Glanzner |

FOREIGN PATENT DOCUMENTS

| | | |
|---|---|---|
| EP | 1726087 B1 | 2/2011 |
| JP | H0544757 | 2/1993 |
| JP | 2002257189 | 9/2002 |
| JP | 3629137 B2 | 3/2005 |
| JP | 2006064101 A | 3/2006 |
| JP | 2009179319 | 8/2009 |

OTHER PUBLICATIONS

Written Opinion issued in related PCT application No. PCT/US2019/018291 dated May 28, 2019.

Gysen, Bart. L. J. et al, Active Electromagnetic Suspension System for Improved Vehicle Dynamics, published on Mar. 3, 2010, Eindhoven University of Technology, pp. 1-8.

Chen, Long et al., Energy Conservation Analysis and Control of Hybrid Active Semiactive Suspension with Three Regulating Damping Levels, published in 2016, Hindawi Publishing Corporation, China, pp. 1-15.

Gysen, B.L.J., Generalized Harmonic Modeling Technique for 2D Electromagnetic Problems: Applied to the Design of a Direct-Drive Active Suspension System, published on Jan. 1, 2011, pp. 1-272, Eindhoven: Technische Universiteit Eindhoven DOI, The Netherlands.

Ebrahimi, Babak, Development of Hybrid Electromagnetic Dampers for Vehicle Suspension Systems, published in 2009, pp. 1-192, Ontario, Canada.

Ebrahimi, Babak et al., Design of a Hybrid Electromagnetic/Hydraulic Damper for Automotive Suspension Systems, published in 2009, pp. 1-5, Ontario, Canada.

Willems, Marco, Chances and Concepts for Recuperating Damper Systems, published in 2012, pp. 1-20, 21st Aachen Colloquium Automobile and Engine Technology 2012, Ingolstadt, Germany.

Asadi, Ehsan et al., Analysis, Prototyping and Experimental Characterization of an Adaptive Hybrid-Electromagnetic Damper for Automotive Suspension Systems, published in 2016, pp. 1-12.

Ogawa, Keisuke, Hitachi Exhibits Electromagnetic Suspension System, Nikkei Business Publications, Japan, published on Oct. 30, 2006, pp. 1-2.

Ribeiro, Roberto et al., Hybrid Variable Damping Control: Design, Simulation, and Optimization, published online May 20, 2014, Springer-Verlag Berlin, Germany, pp. 1-10.

\* cited by examiner

DAMPER WITH ELECTRO-MAGNETIC ACTUATOR

FIELD

The present disclosure relates to automotive shock absorbers/dampers. More particularly, the present disclosure relates to active shock absorbers/dampers that use an electro-magnetic actuator to provide a different magnitude of damping based on a frequency as well as a velocity of an input to the shock absorber/damper.

BACKGROUND

The statements in this section merely provide background information related to the present disclosure and may not constitute prior art.

Shock absorbers are typically used in conjunction with automotive suspension systems or other suspension systems to absorb unwanted vibrations that occur during movement of the suspension system. In order to absorb these unwanted vibrations, automotive shock absorbers are generally connected between the sprung (body) and the unsprung (suspension/drivetrain) masses of the vehicle.

Typical passive shock absorbers provide the same magnitude of damping force regardless of the frequency of the input. For a given input velocity, the damping force generated by a conventional passive shock absorber remains the same regardless of the frequency of the input. Typically, the primary ride frequency of a passenger vehicle is in the range of 1 to 2 Hertz. When a vehicle goes over a road surface with a lower frequency input, a higher amount of damping is preferred to manage the road inputs. During handling events (where directional stability is critical), a higher amount of damping is also preferred. For example, the vehicle may be subjected to body roll during handling events. The frequency of body roll in a typical passenger vehicle commonly ranges from 2 to 4 Hertz depending on the roll-stiffness and the height of the center of gravity of the vehicle. When the damper system experiences larger excitation forces, higher damping forces are required. When conventional passive shock absorbers are used, the higher damping forces result in more harshness and a decrease in ride quality.

Active shock absorbers change the damping of the shock absorber in real-time to address different vehicle suspension inputs. There are many types of active shock absorbers. One type of active shock absorber utilizes an electro-magnetic actuator that applies a magnetic force to a piston rod of the shock absorber independent of the damping forces generated by the compression and rebound valving. Such electro-magnetic actuators typically comprise a combination of permanent magnets and a plurality of coils that are co-axially arranged with one another. The permanent magnets may be mounted to the outer tube of the shock absorber and the plurality of coils may be coupled to the piston rod or vice versa. When electricity is supplied to the plurality of coils, the plurality of coils create an electro-magnetic field that interacts with the magnetic field of the permanent magnets and applies a magnetic force to the piston rod. The magnetic force effectively increases or decreases the damping force of the shock absorber, either firming up or softening the suspension.

Unlike passive shock absorbers, electro-magnetic shock absorbers can generate damping forces independently of the velocity of the piston rod inputs. As a result, large excitation forces do not require more hydraulic damping from the shock absorber and therefore do not introduce increased harshness. This is a major advantage of electro-magnetic shock absorbers because it resolves the trade-off in hydraulic damper systems between primary body control (which requires large damping forces) and secondary comfort (which requires low damping forces). Although active shock absorbers can provide ride and handling improvements, they are considerably more expensive than traditional passive shock absorbers due to the high cost of the electro-magnetic materials used in the electro-magnetic actuator. Electro-magnetic shock absorbers are also expensive because they typically require a shock absorber to be re-designed to accommodate the space required for the permanent magnets and plurality of coils of the electro-magnetic actuator.

SUMMARY

This section provides a general summary of the disclosure, and is not a comprehensive disclosure of its full scope or all of its features.

In accordance with one aspect of the subject disclosure, a damper system for a vehicle is provided. The damper system includes an outer tube that extends along a longitudinal axis between a rod side end and a closed end. A piston assembly is slidably fitted in the outer tube. A piston rod extends within the outer tube along the longitudinal axis between a proximal end that is disposed within the outer tube and a distal end that is outside the outer tube. The piston assembly is coupled to the proximal end of the piston rod. The outer tube contains a hydraulic fluid and the piston assembly separates the outer tube into a first working chamber and a second working chamber. The piston assembly includes a valve assembly operating to control the flow of hydraulic fluid between the first working chamber and the second working chamber. A magnetic rotor is fixed to and extends annularly about the outer tube at a location longitudinally adjacent to the rod side end of the outer tube. A stator assembly is coupled to the piston rod. The stator assembly includes a stator carrier, a plurality of coils, and at least one glide bearing. The stator carrier is coupled to the piston rod. The plurality of coils are supported on the stator carrier and extend annularly about the magnetic rotor. The one or more glide bearings are disposed radially between the plurality of coils and the magnetic rotor. The one or more glide bearings move longitudinally with the stator assembly and are arranged in a sliding fit with the magnetic rotor.

In accordance with another aspect of the subject disclosure, the stator carrier is coupled to the piston rod by a spherical bearing assembly. In accordance with yet another aspect of the subject disclosure, the stator carrier includes an inside surface that faces the magnetic rotor and an outside surface opposite the inside surface. The stator assembly includes a plurality of annular slots on the inside surface of the stator carrier that house the plurality of coils. The plurality of annular slots concentrate an electro-magnetic field generated by the plurality of coils towards the magnetic rotor.

Advantageously, the damper system of the subject invention provides a shock absorber with active damping and energy harvesting capability at reduced cost over other active dampers because the configuration of the magnetic rotor and stator assembly can be retro-fit to existing passive damper designs and can be used with different shock absorbers with little to no modification. Due to the modularity of the design, the electro-magnetic actuator can be installed on a wide range of shock absorbers, which reduces production costs. The presence of a hydraulic damping system in parallel with the electro-magnetic actuator decreases the load requirements of the electro-magnetic actuator and reduces size and therefore the cost of the electro-magnetic actuator. Improvements in ride comfort are achieved over high-frequency motions (e.g., choppiness, shake, filtering) and improved body motion control (e.g., pitch, heave, and roll) is also realized compared to passive shock absorbers. Meanwhile, the hydraulic damping system also provides a fail-safe feature should the electro-magnetic actuator malfunction. The glide bearings, spherical bearing assembly, and the position sensor further provide improvements in ride quality, handling, and durability.

Further areas of applicability and advantages will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

The following description is merely exemplary in nature and is not intended to limit the present disclosure, application, or uses.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Figure 1:
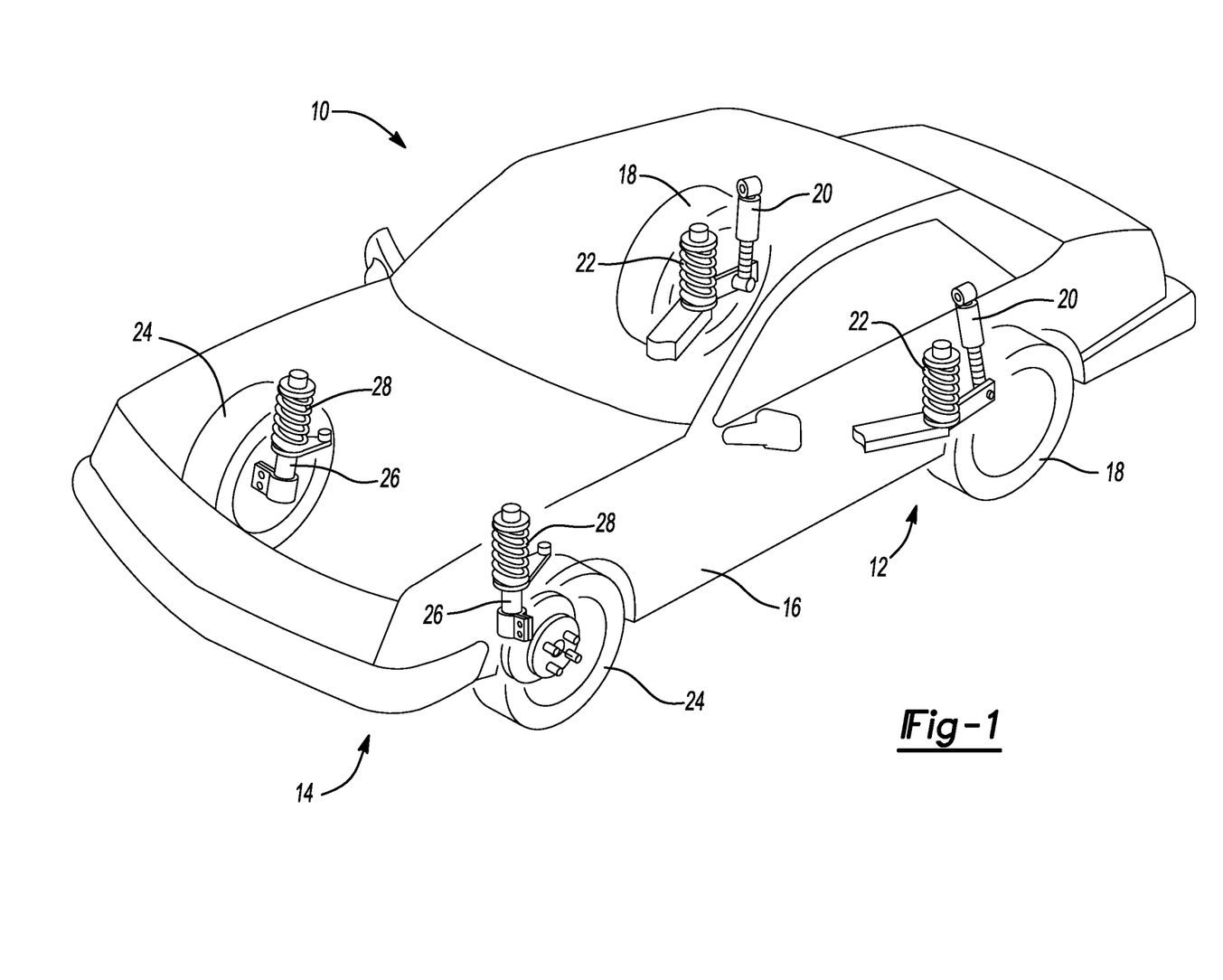
FIG. 1 is an illustration of an exemplary vehicle equipped with a shock absorber in accordance with the teachings of the present disclosure.

Referring to FIG. 1, a vehicle 10 including a rear suspension 12, a front suspension 14, and a body 16 is illustrated. Rear suspension 12 has a transversely extending rear axle assembly (not shown) adapted to operatively support the vehicle's rear wheels 18. The rear axle assembly is operatively connected to body 16 by a pair of shock absorbers 20 and a pair of helical coil springs 22. Similarly, front suspension 14 includes a transversely extending front axle assembly (not shown) to operatively support the vehicle's front wheels 24. The front axle assembly is operatively connected to body 16 by a second pair of shock absorbers 26 and by a pair of helical coil springs 28. Shock absorbers 20 and 26 serve to dampen the relative motion of the unsprung portion (i.e., front and rear suspensions 14 and 12, respectively) and the sprung portion (i.e., body 16) of vehicle 10. While the vehicle 10 has been depicted as a passenger car having front and rear axle assemblies, shock absorbers 20 and 26 may be used with other types of vehicles or machinery, or in other types of applications such as vehicles incorporating independent front and/or independent rear suspension systems. Further, the term "shock absorber" as used herein is meant to refer to shock absorbers and shock absorber systems in general and thus will include MacPherson struts. It should also be appreciated that the scope of the subject disclosure is intended to include shock absorber systems for stand-alone shock absorbers 20 and coil-over shock absorbers 26.

Figure 2:
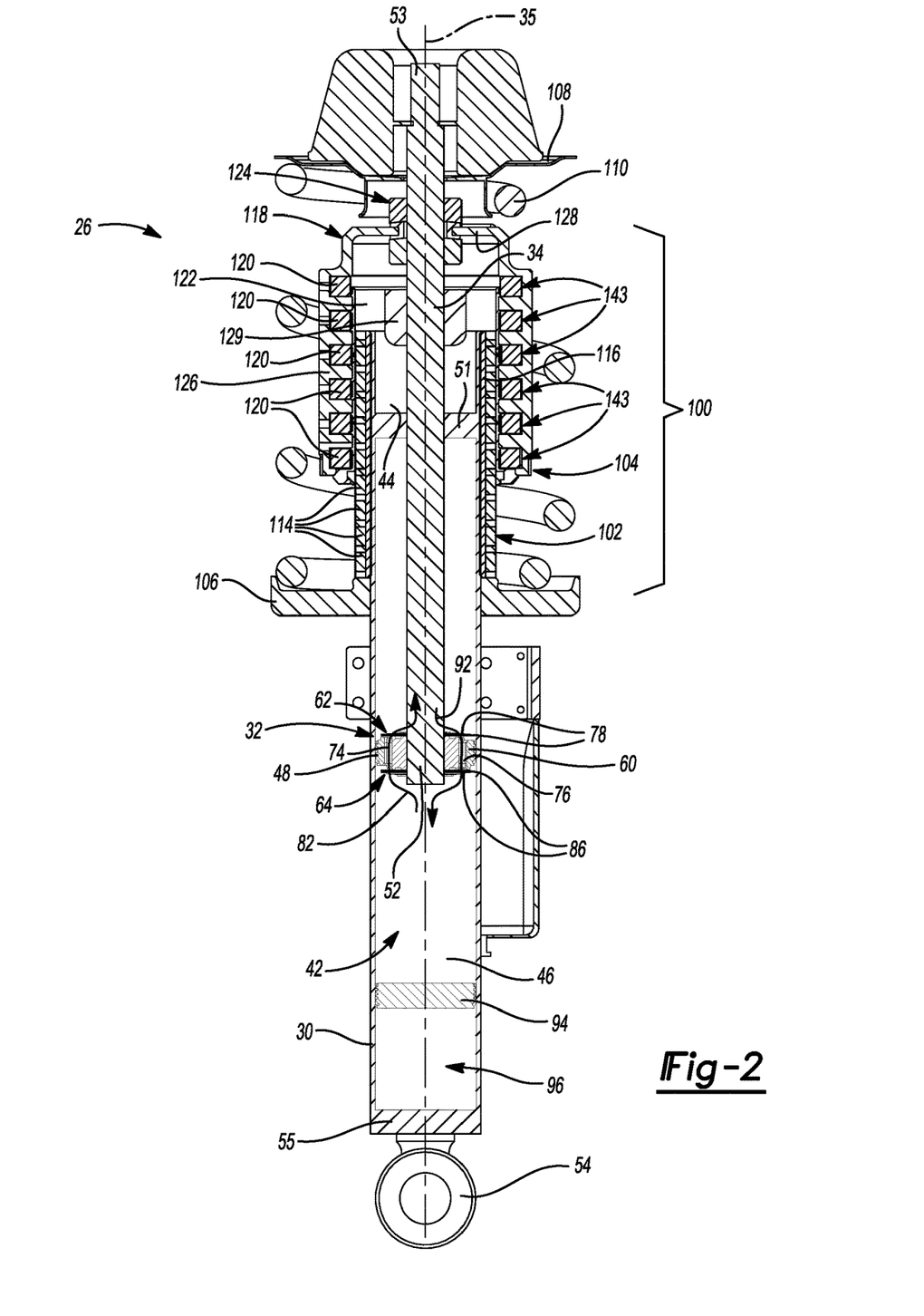
FIG. 2 is a side cross-sectional view of a shock absorber constructed in accordance with the teachings of the present disclosure.

With additional reference to FIG. 2, shock absorber 26 is shown in greater detail. While FIG. 2 shows only shock absorber 26, it is to be understood that shock absorber 20 also includes the piston assembly described below for shock absorber 26. Shock absorber 20 only differs from shock absorber 26 in the way in which it is adapted to be connected to the sprung and unsprung portions of vehicle 10 and the mounting location of the coil spring 28 relative to the shock absorber 26.

Shock absorber 26 comprises an outer tube 30, a piston assembly 32, and a piston rod 34. The outer tube 30 and the piston rod 34 extend co-axially along a longitudinal axis 35. Outer tube 30 defines an internal cavity 42. Piston assembly 32 is slidably disposed within the internal cavity 42 of the outer tube 30 and divides the internal cavity 42 into a first working chamber 44 and a second working chamber 46. A seal 48 is disposed between piston assembly 32 and outer tube 30 to permit sliding movement of piston assembly 32 with respect to outer tube 30 without generating undue frictional forces as well as sealing the first working chamber 44 from the second working chamber 46.

Piston rod 34 is attached to piston assembly 32 and extends through the first working chamber 44 and through a rod side end 51 of the outer tube 30. The piston rod 34 extends longitudinally between a proximal end 52 that is disposed within the internal cavity 42 of the outer tube 30 and connected to the piston assembly 32 and a distal end 53 that is positioned outside the outer tube 30. In the illustrated embodiment, the distal end 53 of the piston rod 34 is connected to the body 16 (i.e., the sprung portion of vehicle 10). Outer tube 30 is filled with a hydraulic fluid and includes an attachment fitting 54 at a closed end 55 of the outer tube 30. In the illustrated embodiment, the attachment fitting 54 is connected to the unsprung portion of the suspension 12 and 14. The first working chamber 44 is thus positioned between the rod side end 51 of the outer tube 30 and the piston assembly 32 and the second working chamber 46 is positioned between the closed end 55 of the outer tube 30 and the piston assembly 32. Suspension movements of the vehicle 10 will cause extension/rebound or compression movements of piston assembly 32 with respect to outer tube 30. Valving within piston assembly 32 controls the movement of hydraulic fluid between the first working chamber 44 and the second working chamber 46 during movement of piston assembly 32 within outer tube 30. It should be appreciated that the shock absorber 26 may be installed in a reverse orientation, where the distal end 53 of the piston rod 34 is connected to the unsprung portion of the suspension 12 and 14 and the attachment fitting 54 is connected to the body 16 (i.e., the sprung portion of vehicle 10).

The piston assembly 32 comprises a piston body 60 that is attached to the proximal end 52 of the piston rod 34, a compression valve assembly 62, and a rebound valve assembly 64. Piston body 60 defines a plurality of compression flow passages 74 and a plurality of rebound flow passages 76. The compression valve assembly 62 operates to control fluid flow of the hydraulic fluid through the plurality of compression flow passages 74 in the piston body 60 and the rebound valve assembly 64 operates to control fluid flow of the hydraulic fluid through the plurality of rebound flow passages 76 in the piston body 60. Therefore, both the compression valve assembly 62 and the rebound valve assembly 64 control fluid flow between the first and second working chambers 44, 46.

Compression valve assembly 62 comprises a plurality of compression valve plates 78. The compression valve plates 78 are disposed adjacent to piston body 60 to cover the plurality of compression flow passages 74. During a compression stroke of shock absorber 26, fluid pressure builds up in the second working chamber 46 until the fluid pressure applied to the compression valve plates 78, through the plurality of compression flow passages 74, overcomes the load required to deflect the plurality of compression valve plates 78. The compression valve plates 78 elastically deflect to open the compression flow passages 74 and allow the hydraulic fluid to flow from the second working chamber 46 to the first working chamber 44 as shown by arrows 82 in FIG. 2.

Rebound valve assembly 64 comprises a plurality of rebound valve plates 86. The rebound valve plates 86 are disposed adjacent to piston body 60 to cover the plurality of rebound flow passages 76 to close the plurality of rebound flow passages 76. During an extension or rebound stroke of the shock absorber 26, fluid pressure builds up in the first working chamber 44 until the fluid pressure applied to the rebound valve plates 86, through the rebound flow passages 76, overcomes the load required to deflect rebound valve plates 86. The plurality of rebound valve plates 86 elastically deflect thereby opening the rebound flow passages 76 to allow the hydraulic fluid to flow from the first working chamber 44 to the second working chamber 46 as shown by arrows 92 in FIG. 2.

Figure 3:
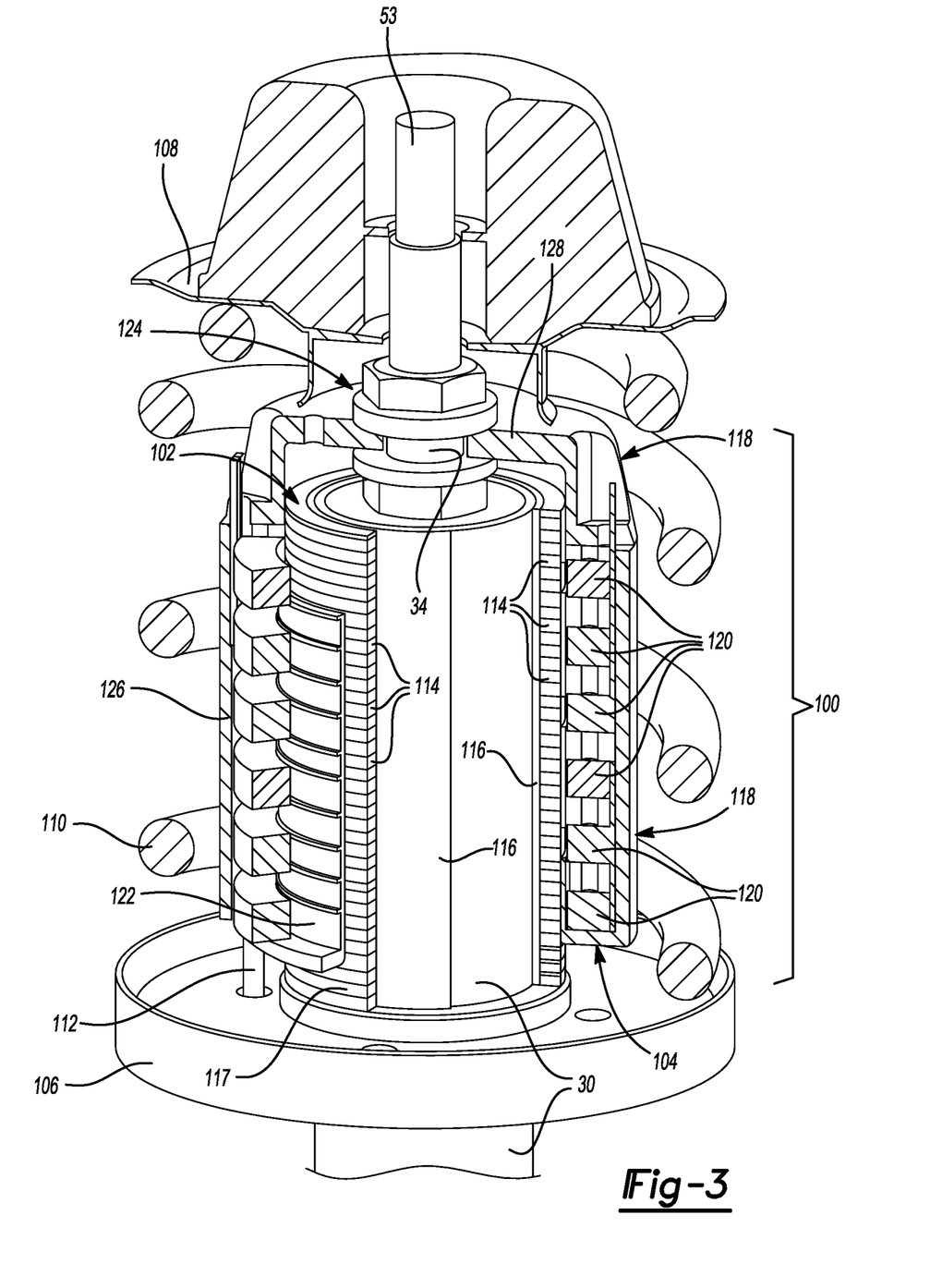
FIG. 3 is a fragmentary perspective view of the shock absorber illustrated in FIG. 2.

With additional reference to FIG. 3, the shock absorber 26 includes an electro-magnetic actuator 100 that actively controls the longitudinal movement of the piston rod 34 relative to the outer tube 30 independently of the damping forces generated by the rebound and compression valve assemblies 62, 64. In other words, the electro-magnetic actuator 100 operates in parallel with the rebound and compression valve assemblies 62, 64 of the shock absorber 26. The electro-magnetic actuator 100 is located entirely outside the outer tube 30 of the shock absorber 26. The electro-magnetic actuator 100 comprises a combination of a magnetic rotor 102 and a stator assembly 104.

The shock absorber 26 includes a spring seat 106 that extends radially outwardly from the outer tube 30 away from the longitudinal axis 35. The spring seat 106 is positioned longitudinally between the rod side end 51 and the closed end 55 of the outer tube 30. The shock absorber 26 also includes an upper strut mount 108 that is coupled to the distal end 53 of the piston rod 34. Both the spring seat 106 and the upper strut mount 108 have an annular, dish-like shape. A spring 110 extends annularly/helically about the piston rod 34 and the electro-magnetic actuator 100 and longitudinally between the spring seat 106 and the upper strut mount 108. The spring 110 is configured to apply a spring force to the distal end 53 of the piston rod 34. In the illustrated embodiment, the spring 110 is a coil spring depicted in a coil-over arrangement. However, it should be appreciated that other types of springs may be used. In addition, it should be appreciated that the subject disclosure is equally applicable to shock absorbers 20 that do not have a coil-over arrangement, where the spring 110 is not co-axially mounted with the outer tube 30 and piston rod 34. Such shock absorbers 20 lack spring seat 106 and upper strut mount 108 shown in FIGS. 2 and 3.

The shock absorber 26 also includes a position sensor 112 that is arranged to measure the longitudinal position of the piston rod 34 relative to the outer tube 30. The position sensor 112 is electrically connected to a controller (not shown). Various types of position sensors may be used. By way of non-limiting example, the position sensor 112 may be a linear potentiometer, a Hall Effect sensor, or an optical encoder. While various types of position sensors may be used, preferably, the position sensor 112 has a resolution of 0.1 millimeters (mm) or smaller to ensure an acceptable level of accuracy. The controller is electrically connected to a power source (not shown), which in turn is electrically connected to the stator assembly 104. The controller controls the power source to selectively supply electric current to the stator assembly 104. As such, the controller is operable to control the amount of force the electro-magnetic actuator 100 applies to the piston rod 34 based at least in part on position (i.e., height) measurements provided by the position sensor 112. A battery (not shown) may also be electrically connected to the stator assembly 104. As will be explained in greater detail below, the stator assembly 104 may optionally be used to convert longitudinal movements of the piston rod 34 relative to the outer tube 30 into electric current. The electric current generated by the stator assembly 104 may be used to charge the battery or run other electric components of the vehicle 10. Thus, the controller may be programmed to provide multiple operating modes including an active damping mode of operation and an energy harvesting mode of operation.

The magnetic rotor 102 of the electro-magnetic actuator 100 is fixed to and extends annularly about the outer tube 30 at a location longitudinally adjacent to the rod side end 51 of the outer tube 30. In the illustrated embodiment, the magnetic rotor 102 includes an array of permanent magnets 114 that are fixed to a carrier sleeve 116. The permanent magnets 114 have an annular shape and are arranged on the carrier sleeve 116 in a longitudinally stacked arrangement (i.e., the permanent magnets 114 are stacked on top of one another on the carrier sleeve 116). The permanent magnets 114 are made from a material that is magnetized. By way of example and without limitation, the permanent magnets 114 may exhibit a Halbach, quasi-Halbach, or slotted pattern of magnetization. The carrier sleeve 116 is fixed to and extends annularly about the outer tube 30 such that the carrier sleeve 116 is positioned radially between the array of permanent magnets 114 and the outer tube 30. The carrier sleeve 116 is made of a ferromagnetic material. By way of example and without limitation, the carrier sleeve 116 is made of iron or ferritic stainless steel. As a result of the ferromagnetic material of the carrier sleeve 116 and the magnetization pattern of the array of permanent magnets 114, the magnetic field produced by the array of permanent magnets 114 is concentrated on the side of the magnet rotor 102 that faces the stator assembly 104.

The carrier sleeve 116 supports the array of permanent magnets 114 and can easily be slid over and secured to the rod side end 51 of the outer tube 30 using fasteners, adhesive, or welding. A coating or thin, non-magnetic sleeve 117 may optionally be applied to the magnetic rotor 102 to protect the array of permanent magnets 114 from corrosion and wear and to provide a smooth, straight contact surface for glide bearing 122. By way of non-limiting example, the coating or thin, non-magnetic sleeve 117 may be made of phenolic resin. Advantageously, the construction of the magnetic rotor 102 described above reduces assembly costs and allows the electro-magnetic actuator 100 to be retro-fit to existing passive shock absorbers without requiring a re-design of the shock absorber.

Figure 4:
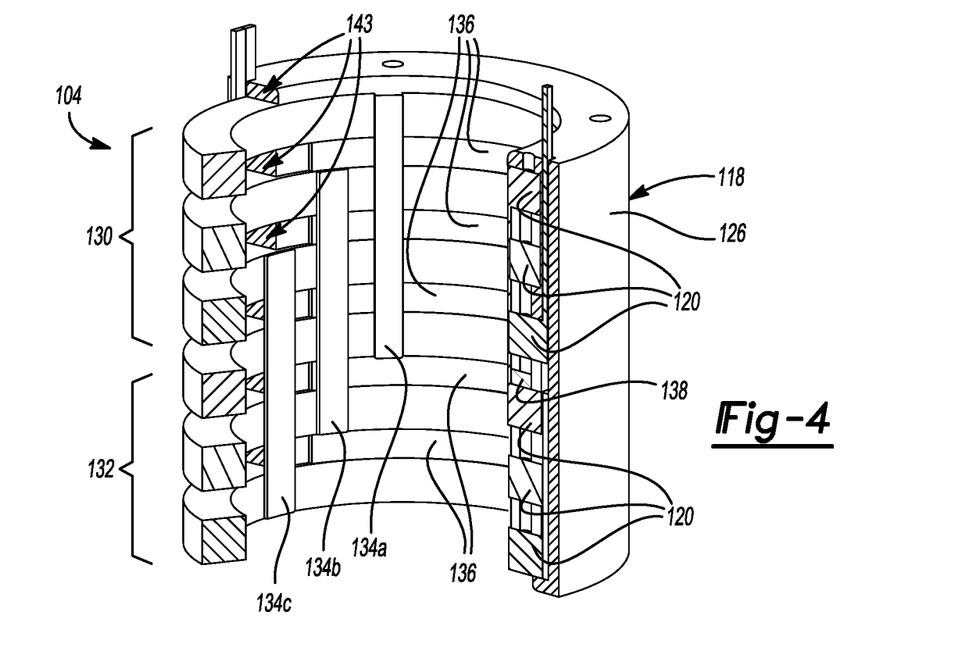
FIG. 4 is a fragmentary perspective view depicting a portion of the stator assembly of the shock absorber illustrated in FIG. 2.
Figure 5:
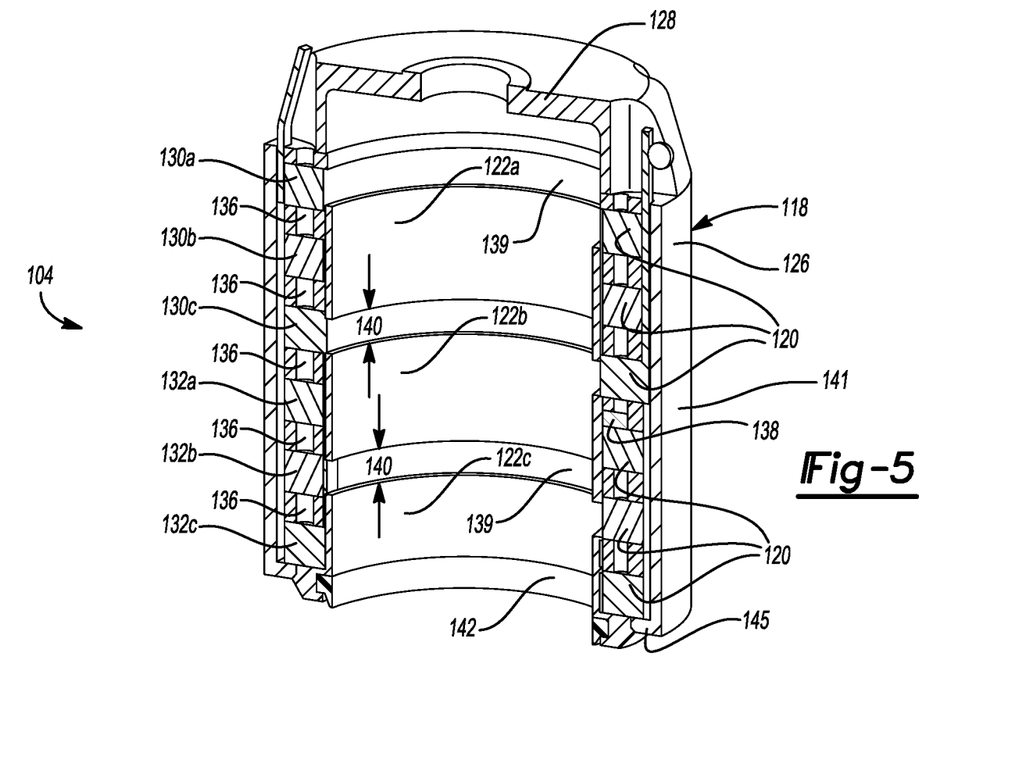
FIG. 5 is a fragmentary perspective view depicting the stator assembly and glide bearings of the shock absorber illustrated in FIG. 2.

The stator assembly 104 is coupled to the piston rod 34 adjacent to distal end 53 with additional reference to FIGS. 4 and 5. The stator assembly 104 includes a stator carrier 118, a plurality of coils 120, and one or more glide bearings 122. As will be explained in greater detail below, the stator carrier 118 is coupled to the piston rod 34 by a spherical bearing assembly 124. The stator carrier 118 supports the plurality of coils 120 and is made of a ferromagnetic material such as ferritic stainless steel. The stator carrier 118 includes a stator body 126 that extends annularly about the plurality of coils 120 and a transverse portion 128 that extends radially inwardly from the stator body 126 to the piston rod 34. Optionally, an end stop 129 (FIG. 2) is positioned on and extends annularly about the piston rod 34 at a location disposed between the transverse portion 128 of the stator carrier 118 and the piston assembly 32. The end stop 129 may be made of an elastomeric material such as polyurethane and prevents metal-to-metal contact between the rod side end 51 of the outer tube 30 and the transverse portion 128 of the stator carrier 118. The plurality of coils 120 extend annularly about the magnetic rotor 102 and are positioned radially inward of the stator body 126. The plurality of coils 120 are spaced radially outwardly from the array of permanent magnets 114 such that the stator assembly 104 is free to slide longitudinally relative magnetic rotor 102.

The array of permanent magnets 114 have a permanent magnetic field that generates an electric current in the plurality of coils 120 when the piston rod 34 (and therefore the stator assembly 104) moves longitudinally along the longitudinal axis 35 relative to the outer tube 30 (and therefore the magnetic rotor 102). This electric current can be used to charge the battery or power other electric components of the vehicle 10 when the shock absorber 26 is operating in the energy harvesting mode of operation. On the other hand, in the active damping mode of operation, the power supply sends electric current to the plurality of coils 120. When this occurs, the plurality of coils 120 generate an electro-magnetic field that interacts with the permanent magnetic field of the permanent magnets 114 to apply a magnetic damping force to the piston rod 34. The interaction between the electro-magnetic field and the permanent magnetic field causes the piston assembly 32 to be pushed towards or away from the closed end 55 of the outer tube 30 depending upon the direction of the polarity of the electro-magnetic field and the permanent magnetic field.

The plurality of coils 120 may be constructed in various ways. In the illustrated embodiment, the plurality of coils 120 include two sets of three phase windings 130, 132 that are electrically connected in parallel with one another. Each set of three phase windings 130, 132 includes a first current phase winding 130*a*, 132*a*, a second current phase winding 130*b*, 132*b*, and a third current phase winding 130*c*, 132*c*. The first current phase windings 130*a*, 132*a* are electrically connected by a first bridge 134*a*, the second current phase windings 130*b*, 132*b* are electrically connected by a second bridge 134*b*, and the third current phase windings 130*c*, 132c are electrically connected by a third bridge 134c. The phase of the electric current the power supply sends to the first current phase windings 130a, 132a is different from the phase of the electric current the power supply sends to the second current phase windings 130b, 132b and the third current phase windings 130c, 132c and vice versa. By way of example and without limitation, each phase of electric current may be delayed by 120 degrees. This provides greater power density and better efficiency such that smaller, lighter windings 130, 132 can be used to produce the same amount of electro-magnetic force as larger, single-phase windings.

Each of the first current phase windings 130a, 132a, the second current phase windings 130b, 132b, and the third current phase windings 130c, 132c are formed of loops of copper wire and are longitudinally spaced by spacer blocks 136 that are arranged in between each of the plurality of coils 120. The plurality of spacer blocks 136 may or may not be integral with the stator carrier 118 and therefore may or may not be made of the same material as the stator carrier 118. By way of example and without limitation, the stator carrier 118 may be made of a ferromagnetic material such as steel. In accordance with one embodiment, the plurality of coils 120 and the spacer blocks 136 are embedded in a resin that holds the plurality of coils 120 and the spacer blocks 136 together as a single unit. Optionally, one or more temperature sensors 138 may be embedded in the resin adjacent to the spacer blocks 136 to monitor operating temperatures within the stator assembly 104. The temperature sensors 138 are electrically connected to the controller, which can change or discontinue a mode of operation and/or activate a cooling system (not shown) based upon the temperature readings of the temperature sensors 138 to prevent the stator assembly 104 from overheating.

The stator carrier 118 includes an inside surface 139 that faces the magnetic rotor 102 and an outside surface 141 that is arranged opposite the inside surface 139 and that faces the spring 110. The stator assembly 104 includes a plurality of annular slots 143 on the inside surface 139 of the stator carrier 118 that house the plurality of coils 120. The plurality of annular slots 143 have a U-shaped cross-section that is open along the inside surface 139 of the stator carrier 118 and closed on the other three-sides to concentrate/direct the electro-magnetic field generated by the plurality of coils 120 towards the magnetic rotor 102. The plurality of annular slots 143 may be formed in several ways. By way of example and without limitation, the plurality of annular slots 143 may be cut or cast into the stator carrier 118. Alternatively, the stator carrier 118 may have a cylindrical shape and separately formed spacer blocks 136 may be stacked to create the plurality of annular slots 143. In addition, to facilitate manufacturing and/or assembly of the stator assembly 104, the stator carrier 118 may have a two-piece design where two halves of the stator carrier 118 come together in a clam-shell arrangement to enclose the plurality of coils 120.

The glide bearing 122 of the stator assembly 104 is disposed radially between the plurality of coils 120 and the permanent magnets 114 of the magnetic rotor 102. The glide bearing 122 moves longitudinally with the stator assembly 104 and is arranged in a sliding fit with the magnetic rotor 102 such that the magnetic rotor 102 and the stator assembly 104 can slide longitudinally relative to one another. The glide bearing 122 reduces friction and guides translation of the magnetic rotor 102 and the stator assembly 104 in a direction that is parallel to the longitudinal axis 35. The material of the glide bearing 122 may have a coefficient of friction of less than 0.25 when brought into contact with the magnetic rotor 102. The material of the glide bearing 122 may also be a non-magnetic material with a magnetic permeability of less than 0.000005 henries per meter (H/m) to avoid deformation of the magnetic flux lines of the permanent magnetic field and the electro-magnetic field. By way of non-limiting example, the glide bearing 122 may be made of a material such as phenolic resin, glass-reinforced polyimide, or polytetrafluoroethylene (PTFE).

As shown in FIG. 5, the stator assembly 104 may optionally include multiple glide bearings 122a, 122b, 122c that are longitudinally spaced from one another by annular gaps 140 that extend radially between the plurality of coils 120 and permanent magnets 114 of the magnetic rotor 102. The stator assembly 104 may also include a wiper ring 142 that contacts the magnetic rotor 102 in a sliding fit to prevent contaminants from entering the stator assembly 104. Although several configurations are possible, in the illustrated embodiment, the wiper ring 142 is fitted on the glide bearing 122 at an end 145 of the stator carrier 118 that is opposite the transverse portion 128 of the stator carrier 118.

Figure 6:
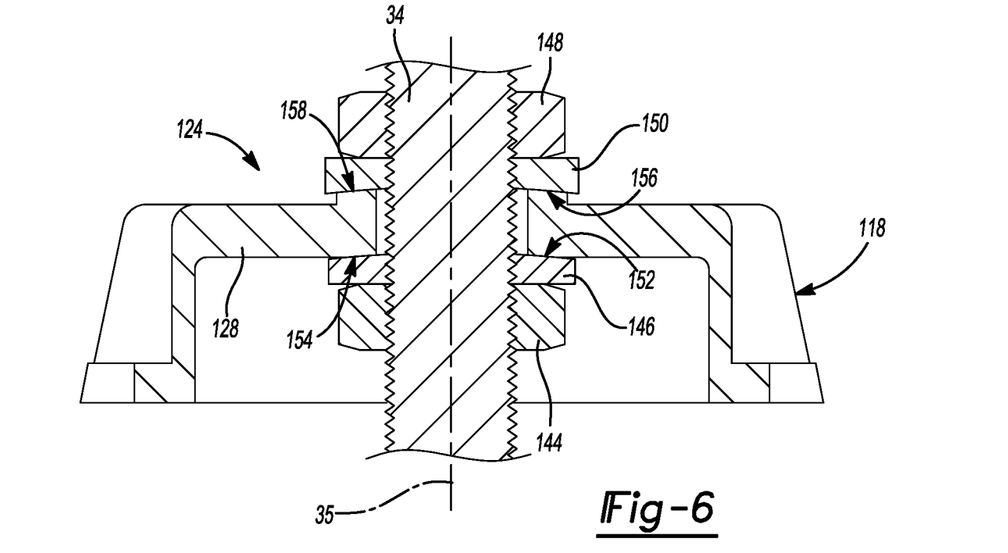
FIG. 6 is a side cross-sectional view depicting a spherical bearing assembly and stator carrier of the shock absorber illustrated in FIG. 2.

With additional reference to FIG. 6, the spherical bearing assembly 124 couples the stator carrier 118 to the piston rod 34 while permitting a gimballing motion of the stator carrier 118 relative to the piston rod 34. The spherical bearing assembly 124 includes a proximal rod nut 144, a proximal bearing 146, a distal rod nut 148, and a distal bearing 150 that cooperate to secure the transverse portion 128 of the stator carrier 118 to the piston rod 34 at a location adjacent to the distal end 53 of the piston rod 34. The proximal rod nut 144 is threadably engaged with the piston rod 34 and positioned longitudinally between the transverse portion 128 of the stator carrier 118 and the piston assembly 32. The proximal bearing 146 is positioned longitudinally between the proximal rod nut 144 and the transverse portion 128 of the stator carrier 118. The proximal bearing 146 includes a convex bearing surface 152 that abuts a concave surface 154 on the transverse portion 128 of the stator carrier 118. The distal rod nut 148 is threadably engaged with the piston rod 34 and positioned longitudinally between the transverse portion 128 of the stator carrier 118 and the distal end 53 of the piston rod 34. The distal bearing 150 is positioned longitudinally between the distal rod nut 148 and the transverse portion 128 of the stator carrier 118. The distal bearing 150 includes a concave bearing surface 156 that abuts a convex surface 158 on the transverse portion 128 of the stator carrier 118. During suspension articulation, the piston rod 34 can flex out of center (i.e., elastic deformation) relative to the outer tube 30. Advantageously, the spherical bearing assembly 124 allows the stator assembly 104 to pivot/gimbal slightly relative to the longitudinal axis 35 without causing damage or excessive wear to the electro-magnetic actuator 100.

Figure 7:
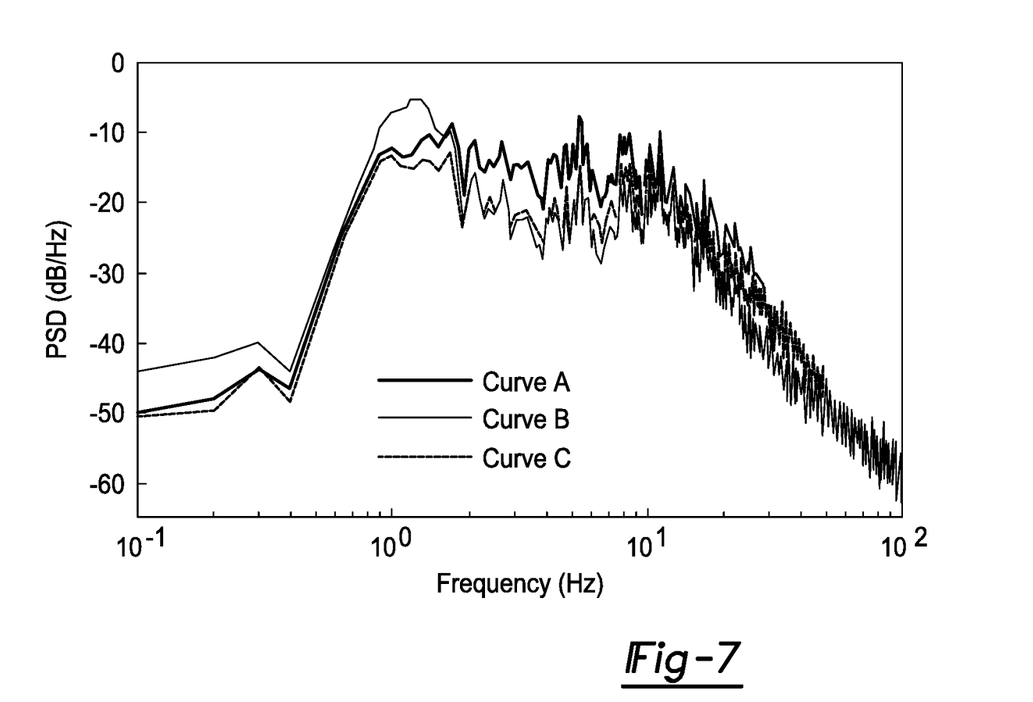
FIG. 7 is a graph of body acceleration versus frequency comparing the comfort achieved by a shock absorber constructed in accordance with the teachings of the present disclosure to the comfort achieved by other shock absorbers.

FIG. 7 is a plot comparing the power spectral density of the acceleration of the body 16 for shock absorber 26 to the power spectral density of the acceleration of the body 16 for other shock absorbers (i.e., passive shock absorbers and hydraulic shock absorbers with one or more electrically controlled valves). Curve A shows the power spectral density of the acceleration of the body 16 for a tradition passive shock absorber. Curve B shows the power spectral density of the acceleration of the body 16 for a hydraulic shock absorber with one or more electrically controlled valves. Curve C shows the power spectral density of the acceleration of the body 16 for the shock absorber 26 of the subject disclosure, which is active and includes electro-magnetic actuator 100. The vertical or y-axis of the plot represents the power spectral density expressed in decibels per Hertz (dB/Hz) and the horizontal or x-axis of the plot represents the frequency of the input applied to the piston rod 34 expressed in Hertz (Hz). The power spectral density (y-axis) represents the acceleration of the body 16 for a given road input and is used to evaluate ride comfort for a vehicle. The x-axis of the plot is expressed on a logarithmic scale. Different frequency bands are considered to evaluate different metrics of ride comfort, including vertical motion amplitude, vertical acceleration feeling, choppiness, shake, and road filtering. The shock absorber 26 of the present disclosure decreases vibration levels compared to traditional passive and semi-active shock absorbers. As can be seen in FIG. 7, the power spectrum density values for semi-active shock absorbers (Curve B) is lower than the power spectrum density values for traditional passive shock absorbers (Curves A) at high frequencies (frequencies above 10° Hertz), but is higher than the power spectrum density values for traditional passive shock absorbers (Curves A) at low frequencies (frequencies above 10° Hertz). This means that semi-active shock absorbers decrease vibration at high frequencies (frequencies above 10° Hertz), but sacrifice ride comfort at low frequencies (frequencies below 10° Hertz). The power spectrum density values for the shock absorber 26 of the subject disclosure (Curve C) is lower than the power spectrum density values for traditional passive shock absorbers (Curves A) at high frequencies (frequencies above 10° Hertz) and low frequencies (frequencies below 10° Hertz). This means that the shock absorber 26 of the subject disclosure provides improvement ride comfort at all frequencies without any trade-off between high and low frequency damping.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the subject disclosure, and all such modifications are intended to be included within the scope of the subject disclosure.

What is claimed is:

1. A damper system for a vehicle, comprising:
   an outer tube extending along a longitudinal axis between a closed end and a rod side end;
   a piston rod extending along the longitudinal axis between a proximal end and a distal end, the piston rod extending through the rod side end in the outer tube such that the proximal end of the piston rod is disposed within the outer tube and the distal end of the piston rod is outside the outer tube;
   a piston assembly slidably fitted in the outer tube for movement along the longitudinal axis;
   a magnetic rotor fixed to and extending annularly about the outer tube at a location longitudinally adjacent to the rod side end of the outer tube; and
   a stator assembly coupled to the piston rod adjacent to a distal end, the stator assembly including a stator carrier coupled to the piston rod, a plurality of coils that are supported on the stator carrier and extend annularly about the magnetic rotor, and at least one glide bearing that is disposed radially between the plurality of coils and the magnetic rotor, wherein the at least one glide bearing moves longitudinally with the stator assembly and is arranged in a sliding fit with the magnetic rotor.

2. The damper system of claim 1, wherein the magnetic rotor includes an array of permanent magnets fixed to a carrier sleeve, the carrier sleeve fixed to and extending annularly about the outer tube such that the carrier sleeve is positioned radially between the array of permanent magnets and the outer tube.

3. The damper system of claim 2, wherein the carrier sleeve is made of a ferromagnetic material and the array of permanent magnets extend annularly about the carrier sleeve in a longitudinally stacked arrangement.

4. The damper system of claim 1, wherein the plurality of coils are longitudinally spaced by spacer blocks arranged in between the plurality of coils.

5. The damper system of claim 1, further comprising:
   at least one temperature sensor positioned in the stator assembly to monitor operating temperatures within the stator assembly.

6. The damper system of claim 1, wherein the at least one glide bearing includes a plurality of glide bearings that are longitudinally spaced from one another by annular gaps that extend radially between the plurality of coils and the magnetic rotor.

7. The damper system of claim 1, wherein the stator carrier includes a stator body that extends annularly about and supports the plurality of coils and a transverse portion that extends radially inwardly from the stator body to the piston rod.

8. The damper system of claim 1, wherein the magnetic rotor includes an array of permanent magnets that have a permanent magnetic field that generates an electrical current in the plurality of coils when the piston rod moves longitudinally relative to the outer tube in an energy harvesting mode of operation for the damper system and the plurality of coils generating an electro-magnetic field in response to the application of an electrical current to the plurality of coils that interacts with the permanent magnetic field of the permanent magnets to apply a magnetic damping force to the piston rod in an active damping mode of operation of the damper system.

9. The damper system of claim 1, wherein the plurality of coils include at least one set of three phase windings.

10. The damper system of claim 1, wherein the stator assembly includes a wiper ring that extends annularly about and contacts the magnetic rotor in a sliding fit to prevent contaminants from entering the stator assembly.

11. The damper system of claim 1, further comprising:
    a spring seat that extends radially outwardly from the outer tube at a longitudinal position located between the closed end and the rod side end of the outer tube;
    an upper strut mount coupled to the distal end of the piston rod; and
    a spring extending annularly about the piston rod and stator assembly and longitudinally between the spring seat and the upper strut mount that applies a spring force to the piston rod.

12. The damper system of claim 1, further comprising:
    a position sensor arranged to measure a longitudinal position of the piston rod relative to the outer tube.

13. The damper system of claim 1, further comprising a spherical bearing assembly coupling the stator carrier to the piston rod while permitting gimballing motion of the stator carrier relative to the piston rod, the spherical bearing assembly including:
    a proximal rod nut threadably engaged with the piston rod and positioned longitudinally between a transverse portion of the stator carrier and the piston assembly;

a proximal bearing positioned longitudinally between the proximal rod nut and the transverse portion of the stator carrier, the proximal bearing including a convex bearing surface that abuts a concave surface on the transverse portion of the stator carrier;

a distal rod nut threadably engaged with the piston rod and positioned longitudinally between the transverse portion of the stator carrier and the distal end of the piston rod; and a distal bearing positioned longitudinally between the distal rod nut and the transverse portion of the stator carrier, the distal bearing including a concave bearing surface that abuts a convex surface on the transverse portion of the stator carrier.

14. A damper system for a vehicle, comprising:

an outer tube extending along a longitudinal axis between a closed end and a rod side end;

a piston rod extending along the longitudinal axis between a proximal end and a distal end, the piston rod extending through the rod side end in the outer tube such that the proximal end of the piston rod is disposed within the outer tube and the distal end of the piston rod is outside the outer tube;

a piston assembly slidably fitted in the outer tube for movement along the longitudinal axis;

a magnetic rotor fixed to and extending annularly about the outer tube at a location longitudinally adjacent to the rod side end of the outer tube; and a stator assembly coupled to the piston rod adjacent to a distal end, the stator assembly including a stator carrier coupled to the piston rod by a spherical bearing assembly and a plurality of coils that are supported on the stator carrier and extend annularly about the magnetic rotor.

15. The damper system of claim 14, wherein the spherical bearing assembly includes:

a proximal rod nut threadably engaged with the piston rod and positioned longitudinally between a transverse portion of the stator carrier and the piston assembly;

a proximal bearing positioned longitudinally between the proximal rod nut and the transverse portion of the stator carrier, the proximal bearing including a convex bearing surface that abuts a concave surface on the transverse portion of the stator carrier;

a distal rod nut threadably engaged with the piston rod and positioned longitudinally between the transverse portion of the stator carrier and the distal end of the piston rod; and a distal bearing positioned longitudinally between the distal rod nut and the transverse portion of the stator carrier, the distal bearing including a concave bearing surface that abuts a convex surface on the transverse portion of the stator carrier.

16. The damper system of claim 14, wherein the magnetic rotor includes an array of permanent magnets that have a permanent magnetic field that generates an electrical current in the plurality of coils when the piston rod moves longitudinally relative to the outer tube in an energy harvesting mode of operation for the damper system and the plurality of coils generating an electro-magnetic field in response to the application of an electrical current to the plurality of coils that interacts with the permanent magnetic field of the permanent magnets to apply a magnetic damping force to the piston rod in an active damping mode of operation of the damper system.

17. A damper system for a vehicle, comprising:

an outer tube extending along a longitudinal axis between a closed end and a rod side end;

a piston rod extending along the longitudinal axis between a proximal end and a distal end, the piston rod extending through the rod side end in the outer tube such that the proximal end of the piston rod is disposed within the outer tube and the distal end of the piston rod is outside the outer tube;

a piston assembly slidably fitted in the outer tube for movement along the longitudinal axis;

a magnetic rotor fixed to and extending annularly about the outer tube at a location longitudinally adjacent to the rod side end of the outer tube; and a stator assembly coupled to the piston rod adjacent to a distal end, the stator assembly including a stator carrier coupled to the piston rod and a plurality of coils that are supported on the stator carrier and extend annularly about the magnetic rotor, the stator carrier including an inside surface that faces the magnetic rotor and an outside surface opposite the inside surface, wherein the stator assembly includes a plurality of annular slots on the inside surface of the stator carrier that house the plurality of coils.

18. The damper system of claim 17, wherein the plurality of annular slots have a U-shaped cross-section that is open along the inside surface of the stator carrier to concentrate an electro-magnetic field generated by the plurality of coils towards the magnetic rotor.

19. The damper system of claim 18, wherein the magnetic rotor includes an array of permanent magnets fixed to a carrier sleeve, the carrier sleeve fixed to and extending annularly about the outer tube such that the carrier sleeve is positioned radially between the array of permanent magnets and the outer tube.

20. The damper system of claim 19, wherein the array of permanent magnets extend annularly about the carrier sleeve in a longitudinally stacked arrangement.

* * * * *